United States Patent [19]

Sakai et al.

[11] Patent Number: 6,007,164
[45] Date of Patent: Dec. 28, 1999

[54] BRAKE FLUID PRESSURE CONTROL APPARATUS FOR COMPENSATING A MALFUNCTION OF BRAKE OPERATIONAL FORCE SENSOR

[75] Inventors: Akira Sakai; Akihiro Ohtomo; Fumiaki Kawahata; Hirohiko Morikawa; Kiyoharu Nakamura, all of Toyota, Japan

[73] Assignee: Toyota Jidosha Kabushiki Kaisha, Aichi-ken, Japan

[21] Appl. No.: 08/896,730

[22] Filed: Jul. 21, 1997

[30] Foreign Application Priority Data

Aug. 1, 1996 [JP] Japan ................................ 8-203879

[51] Int. Cl.$^6$ ........................... B60T 13/12; B60T 13/68
[52] U.S. Cl. ................................ 303/122.12; 303/122.11
[58] Field of Search ..................... 303/122.11, 122.12, 303/122.13, 122.14, 166, 174

[56] References Cited

U.S. PATENT DOCUMENTS

| | | | |
|---|---|---|---|
| 4,462,642 | 7/1984 | Leiber | 303/122.13 |
| 5,106,170 | 4/1992 | Matsuda et al. | 303/122.13 |
| 5,544,948 | 8/1996 | Schmidt et al. | 303/122.11 |
| 5,545,929 | 8/1996 | Fijioka et al. | 303/174 |
| 5,709,438 | 1/1998 | Isakson et al. | 303/122.12 |
| 5,711,584 | 1/1998 | Kawahata | 303/122.12 |

FOREIGN PATENT DOCUMENTS

| | | |
|---|---|---|
| 4229041 | 3/1993 | Germany . |
| 4-232154 | 8/1992 | Japan . |

*Primary Examiner*—Matthew C. Graham
*Attorney, Agent, or Firm*—Kenyon & Kenyon

[57] ABSTRACT

A brake fluid pressure control apparatus achieves a sufficiently large brake force even when a malfunction occurs in an operational force sensor for detecting a level of operational force applied to a brake system. A magnitude of a master cylinder pressure generated by a master cylinder is detected by a master cylinder pressure sensor. A linear fluid pressure source generates a linear fluid pressure adjusted by the magnitude of the master cylinder pressure. Front wheel cylinders and rear wheel cylinders are provided with the linear fluid pressure. A front wheel cylinder pressure is detected and a front wheel cylinder pressure value corresponding to a magnitude of the front wheel cylinder pressure is output by a front wheel cylinder sensor. If it is determined that a malfunction is occurring in the operational force sensor, a connection of the front wheel cylinders is switched from the linear fluid pressure source to the master cylinder. At this time, the linear fluid pressure source is controlled based on the front wheel cylinder pressure value.

10 Claims, 3 Drawing Sheets

BRAKE FLUID PRESSURE CONTROL APPARATUS FOR COMPENSATING A MALFUNCTION OF BRAKE OPERATIONAL FORCE SENSOR

BACKGROUND OF THE INVENTION

1. Field of the Invention

The present invention generally relates to a brake fluid pressure control apparatus and, more particularly, to a brake fluid pressure apparatus which is suitable for controlling a pressure of brake fluid in a brake apparatus for a vehicle.

2. Description of the Related Art

Conventionally, as described in Japanese Laid-Open Patent Application No. 4-232154, for example, a brake fluid pressure apparatus is known which comprises a master cylinder for generating a fluid pressure in response to a depression force of a brake and an electronically controlled fluid pressure generating mechanism for generating a brake fluid pressure in response to a designated value. The above-mentioned conventional apparatus includes a stroke sensor for detecting an amount of stroke of a brake pedal and a depression force sensor for detecting a brake depression force exerted on the brake pedal.

When the stroke sensor and the depression force sensor (hereinafter, these sensors are referred to as an operational force sensor as a whole) function normally, a level of brake force which a driver intends to generate can be assumed based on detection values of these sensors. When the operational force sensors are normally operated, the above-mentioned conventional apparatus controls an electronically controlled fluid pressure generating mechanism based on the detected values of the sensors, and adjusts a wheel cylinder pressure $P_{W/C}$ by using the electronically controlled fluid pressure generating mechanism as a fluid pressure source.

In the above-mentioned conventional apparatus, if an abnormality occurs in the operational force sensor, it is difficult to generate an appropriate brake fluid pressure by the electronically controlled fluid pressure generating mechanism in response to the brake operational force. Thus, in the above-mentioned conventional apparatus, when an abnormality is detected in the operational force sensor, each wheel cylinder is connected to a master cylinder instead of the electronically controlled fluid pressure generating mechanism.

In the above-mentioned structure, when the operational force sensor functions normally, the wheel cylinder pressure $P_{W/C}$ can be adjusted to a fluid pressure of a predetermined power ratio relative to a brake operational force by providing a brake fluid pressure generated by the electronically controlled fluid pressure generating mechanism to the wheel cylinder. On the other hand, when an abnormality occurs in the operational force sensor, the wheel cylinder pressure can be adjusted to an appropriate pressure by providing the master cylinder pressure to the wheel cylinder.

In the above-mentioned conventional brake fluid pressure control apparatus, when the master cylinder pressure $P_{M/C}$ is provided to the wheel cylinder, it is difficult to obtain a large brake force as compared to that obtained when the brake fluid pressure generated by the electronically controlled brake fluid generating mechanism is provided to the wheel cylinder. In this regard, the above-mentioned conventional apparatus has a characteristic that a large brake force is difficult to be obtained when an abnormality occurs in the operational force sensor.

SUMMARY OF THE INVENTION

It is a general object of the present invention to provide an improved and useful brake fluid pressure control apparatus in which the above-mentioned problems are eliminated.

A more specific object of the present invention is to provide a brake fluid pressure control apparatus which can achieve a sufficiently large brake force even when a malfunction occurs in an operational force sensor for detecting a level of operational force applied to a brake pedal.

In order to achieve the above-mentioned objects, there is provided according to the present invention a brake fluid pressure control apparatus for a brake system of a vehicle, comprising:

an operational force sensor detecting a magnitude of an operational force applied to the brake system to generate a brake force;

a master cylinder generating a master cylinder pressure corresponding to the operational force;

a linear fluid pressure source generating a linear fluid pressure adjusted by the magnitude of the operational force detected by the operational force sensor;

a first wheel cylinder provided with the linear fluid pressure;

a second wheel cylinder provided with the linear fluid pressure;

a first wheel cylinder pressure sensor detecting a first wheel cylinder pressure in the first wheel cylinder and outputting a first wheel cylinder pressure value corresponding to a magnitude of the first wheel cylinder pressure;

operational force sensor malfunction determining means for determining an occurrence of a malfunction generated in the operational force sensor;

fluid pressure source switching means for switching a connection of the first wheel cylinder from the linear fluid pressure source to the master cylinder when the malfunction occurs in the operational force sensor;

abnormal time control means for controlling the linear fluid pressure source based on the first wheel cylinder pressure value of the first wheel cylinder pressure sensor when the malfunction occurs in the operational force sensor.

According to the present invention, when the operational force sensor is normal, the linear fluid pressure source is controlled based on the detected value of the operational force sensor. At that time, the linear fluid pressure source generates a brake fluid pressure corresponding to the brake operational force. The brake fluid pressure generated by the linear fluid pressure source is provided to the first wheel cylinder and second wheel cylinder. As a result, the first wheel cylinder and second wheel cylinder generate a brake force corresponding to the brake fluid pressure generated by the linear fluid pressure source. If the operational force sensor is malfunctioning, the fluid pressure source of the first wheel cylinder is switched from the linear fluid pressure source to the master cylinder. Thus, if the operational force sensor is malfunctioning, the master cylinder pressure is introduced into the first wheel cylinder, and the master cylinder pressure is detected by the first wheel cylinder pressure sensor. At this time, the abnormal time control means controls the linear fluid pressure source based on the master cylinder pressure detected by the first wheel cylinder sensor. In this case, the linear fluid pressure source generates a brake fluid pressure corresponding to the brake operational force similar to the state where the operational force sensor is normal. The brake fluid pressure generated by the linear fluid pressure source is provided to the second wheel cylinder. As a result, the first wheel cylinder and the second wheel cylinder generate the brake force corresponding to the master cylinder pressure and the brake force corresponding to the brake fluid pressure corresponding to the linear fluid power source.

According to the above-mentioned invention, the master cylinder pressure is introduced into the first wheel cylinder when the operational force sensor is malfunctioning, and a brake fluid pressure generated by the linear fluid pressure source is introduced into the second wheel cylinder similar to the case when the operational force sensor is normal. Thus, in the brake fluid pressure control apparatus according to the present invention, a large brake force can be easily generated when the operational force sensor is malfunctioning.

In one embodiment of the present invention, the operational force sensor comprises a master cylinder pressure sensor detecting the master cylinder pressure generated in the master cylinder and outputs a master cylinder pressure value corresponding to a magnitude of the master cylinder pressure.

The brake fluid pressure control apparatus according to the present invention may further comprise a pressure switch which operates when the master cylinder pressure generated in the master cylinder exceeds a predetermined pressure.

The operational force sensor malfunction determining means may determine an occurrence of a malfunction in the master cylinder pressure sensor based on an output of the pressure switch, the master cylinder pressure value and the first wheel cylinder pressure value.

Additionally, an occurrence of a malfunction in the pressure switch is determined based on an output of the pressure switch, the master cylinder pressure value and the first wheel cylinder pressure value.

An occurrence of a malfunction in the brake fluid pressure control apparatus other than a malfunction in the master cylinder pressure sensor and the pressure switch may be determined based on an output of the pressure switch, the master cylinder pressure value and the first wheel cylinder pressure value.

Additionally, the first and second wheel cylinders are disconnected from the linear fluid pressure source and connected to the master cylinder so that the master cylinder pressure is provided to the first and second wheel cylinders when the occurrence of a malfunction other than a malfunction in the master cylinder pressure sensor and the pressure switch is determined.

In one embodiment of the present embodiment, the brake fluid pressure control apparatus may further comprise a second wheel cylinder pressure sensor detecting a second wheel cylinder pressure in the second wheel cylinder and outputting a second wheel cylinder pressure value corresponding to a magnitude of the second wheel cylinder pressure, wherein the linear fluid pressure source includes a first linear fluid pressure source and a second linear fluid pressure source, the first wheel cylinder pressure and the second wheel cylinder pressure being adjusted in proportion to the master cylinder pressure when the operational force sensor malfunction determining means determines an absence of malfunction in the master cylinder pressure sensor.

Additionally, the brake fluid pressure control apparatus according to the present invention may further comprise:

a second wheel cylinder pressure sensor detecting a second wheel cylinder pressure in the second wheel cylinder and outputting a second wheel cylinder pressure value corresponding to a magnitude of the second wheel cylinder pressure;

assumed vehicle deceleration calculating means for calculating an assumed deceleration being generated by the vehicle based on the first wheel cylinder pressure value and the second wheel cylinder pressure value;

actual deceleration determining means for determining an actual deceleration being actually generated in the vehicle; and abnormal control prohibiting means for prohibiting a control of the abnormal time control means when a difference between the assumed deceleration and the actual deceleration exceeds a predetermined value.

In this invention, the assumed vehicle deceleration calculating means calculates the assumed deceleration of the vehicle based on the detected values of the first wheel cylinder pressure sensor and the second wheel cylinder pressure sensor, that is, the wheel cylinder pressure generated in the first wheel cylinder and the second wheel cylinder. If the difference between the assumed vehicle deceleration and the actual vehicle deceleration is not improperly large, it is determined that the brake force control is appropriately performed. On the other hand, if the difference between the assumed vehicle deceleration and the actual vehicle deceleration is improperly large, it is determined that the brake force control is not appropriately performed. If it is determined that the brake force control is not appropriately performed, execution of a control to provide a brake fluid pressure which is adjusted by the detected value of the first wheel cylinder pressure sensor is prohibited. The second wheel cylinder pressure sensor may be replaced by an assuming unit which assumes the second wheel cylinder pressure based on the detected value of the first wheel cylinder pressure sensor.

According to the above-mentioned invention, an execution of a control in which the brake fluid pressure adjusted based on the detected value of the first wheel cylinder pressure sensor is provided to the second wheel cylinder can be prevented if it is determined that an appropriated brake force control is not being performed from the difference between the assumed vehicle deceleration and the actual vehicle deceleration. Thus, in the brake fluid pressure control apparatus according to the present invention, a problem in that an improper brake force control is performed can be avoided by performing a control to maintain a fail safe function with respect to a malfunction of the operational force sensor.

In one embodiment of the above-mentioned invention, the assumed vehicle deceleration means may calculates the assumed deceleration by referring to a map representing a relationship between the assumed deceleration and the first and second wheel cylinder pressure values.

Other objects, features and advantages of the present invention will become more apparent from the following detailed description when read in conjunction with the accompanying drawings.

DETAILED DESCRIPTION OF THE PREFERRED EMBODIMENTS

Figure 1:
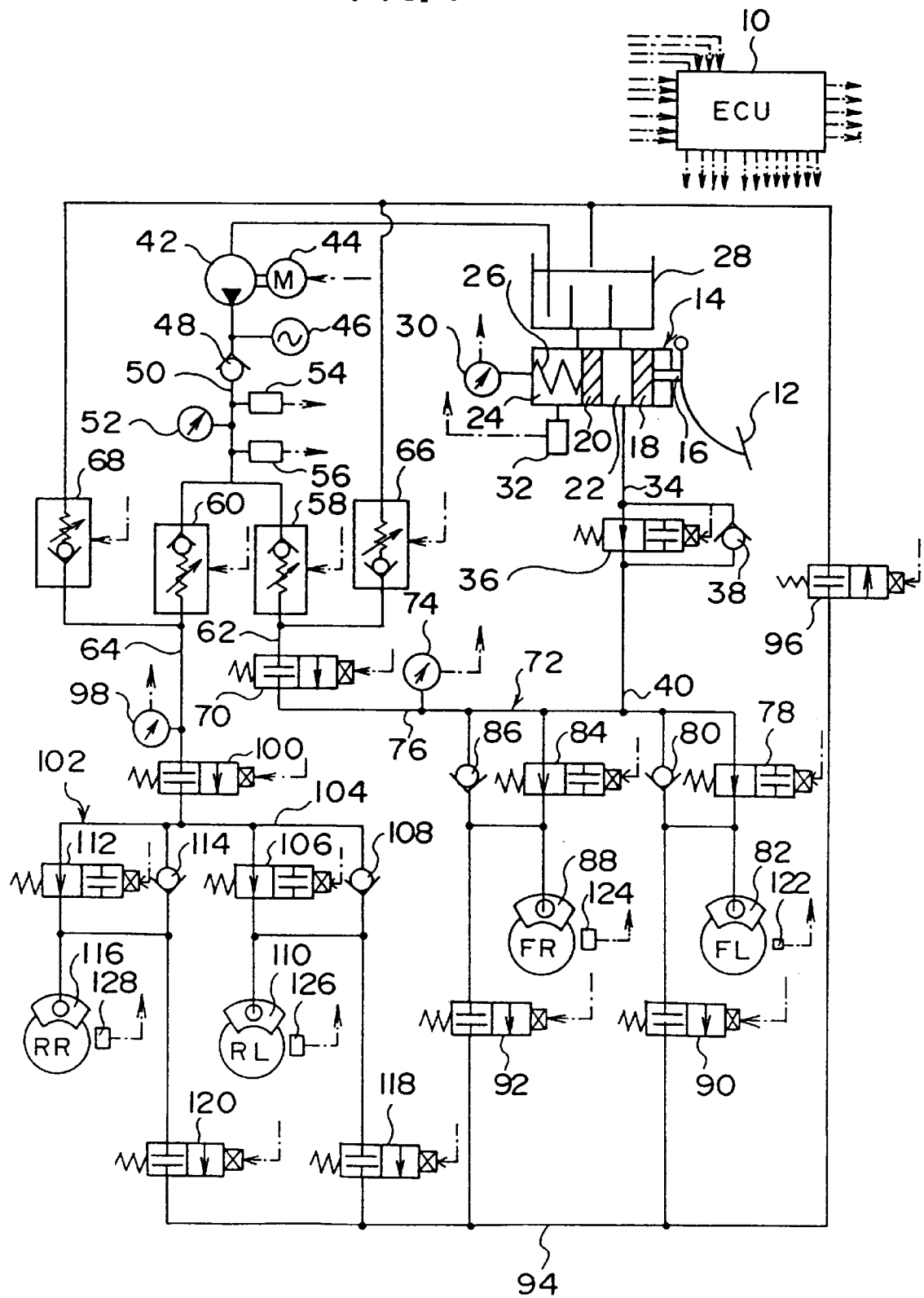
FIG. 1 is a system structure diagram of a brake fluid pressure control apparatus according to an embodiment of the present invention.

FIG. 1 is a system structure diagram of a brake fluid pressure control apparatus according to an embodiment of the present invention. The brake fluid pressure control apparatus includes an electronic control unit 10 (hereinafter referred to as an ECU 10). The brake fluid pressure control apparatus is controlled by the ECU 10.

The brake fluid pressure control apparatus includes a brake pedal 12. The brake pedal 12 is connected to an input shaft 16 of a master cylinder 14. The master cylinder 14 comprises a first piston 18 and a second piston 20. The first piston 18 is connected to the input shaft 16. A first fluid pressure chamber 22 is formed between the first piston 18 and the second piston 20. In addition, a second fluid pressure chamber 24 is formed between the second piston 20 and a bottom surface of the master cylinder 14. A spring 26 which presses the second piston toward the brake pedal 12 is provided in the second fluid pressure chamber 24.

A reservoir tank 28 is provided above the master cylinder 14. The reservoir tank 28 stores brake fluid. The first fluid pressure chamber 22 and the second fluid pressure chamber of the master cylinder 14 are connected to the reservoir tank 28 only when the first piston 18 and the second piston 20 are located at their original positions. Accordingly, the first fluid pressure chamber 22 and the second fluid pressure chamber 24 are filled with the brake fluid each time the depression of the brake pedal 12 is released.

A master cylinder pressure sensor 30 (hereinafter referred to as $P_{M/C}$ sensor 30) and a pressure switch 32 are connected to the second fluid pressure chamber 24 of the master cylinder 14. The $P_{M/C}$ sensor 30 outputs an electric signal in response to a pressure in the second fluid pressure chamber 24. The output signal of the $P_{M/C}$ sensor 30 is supplied to the ECU 10. The ECU 10 detects the master cylinder pressure $P_{M/C}$ based on the output signal of the $P_{M/C}$ sensor 30. On the other hand, the pressure switch 32 outputs an on-signal when the pressure in the second fluid pressure chamber 24 exceeds a predetermined value. The output signal of the pressure switch 32 is supplied to the ECU 10. The ECU 10 determines whether or not a braking operation is being performed based on the output signal of the pressure switch 32.

A fluid pressure passage 34 is connected to the first fluid pressure chamber 22 of the master cylinder 14. The fluid pressure passage 34 is connected to a fluid pressure passage 40 via a master cylinder cut valve 36 (hereinafter, referred to as a master CV 36) and a check valve 38. The master CV 36 is a two-position solenoid valve which normally maintains an open state. The master CV 36 is closed when a drive signal is supplied from the ECU 10. The check valve 38 is a one-way valve which permits only a flow of fluid from the fluid pressure passage 34 to the fluid pressure passage 40.

The brake fluid pressure control apparatus according to the present embodiment includes a pump 42. The pump 42 has a motor 44. The motor 44 is controlled by the ECU 10. A suction port of the pump 42 is connected to the reservoir tank 28. A discharge port of the pump 42 is connected to an accumulator 46, and is also connected to a high-pressure passage 50.

The high-pressure passage 50 is connected to an accumulator sensor 52 (hereinafter referred to as $P_{ACC}$ sensor 52). The $P_{ACC}$ sensor 52 outputs an electric signal in response to a pressure in the high-pressure passage 50. The output signal of the $P_{ACC}$ sensor 52 is supplied to the ECU 10. The ECU 10 detects the pressure in the high-pressure passage 50, that is, the pressure stored in the accumulator 46 (hereinafter referred to as accumulator pressure $P_{ACC}$) based on the output signal of the $P_{ACC}$ sensor 52.

The high-pressure passage 50 is provided with an upper limit sensor 54 and a lower limit sensor 56. The upper limit sensor 54 outputs an on-signal when the pressure in the high-pressure passage 50, that is, the accumulator pressure $P_{ACC}$ is greater than an upper limit value of a range to be used. On the other hand, the lower limit sensor 56 outputs an on-signal when the accumulator pressure $P_{ACC}$ is less than a lower limit value of a range to be used. Both the output signal of the upper limit sensor 54 and the output signal of the lower limit sensor 56 are supplied to the ECU 10. The ECU 10 supplies a drive signal to the motor 44 for a time period after the on-signal is output from the lower limit sensor 56 until the on-signal is output from the upper limit sensor 54. According to the above-mentioned operation, the accumulator pressure $P_{ACC}$ is always maintained within a predetermined range to be used.

A front pressurize linear valve 58 and a rear pressurize linear valve 60 are connected to the high-pressure passage 50. The front pressurize linear valve 58 and a rear pressurize linear valve 60 are also connected to a front fluid pressure passage 62 and a rear fluid pressure passage 64, respectively. The front fluid pressure passage 62 is connected to the reservoir tank 28 via a front depressurize linear valve 66. The rear fluid pressure passage 64 is connected to the reservoir tank 28 via a rear depressurize linear valve 68.

The front pressurize linear valve 58, the rear pressurize linear valve 60, the front depressurize linear valve 66 and the rear depressurize linear valve 68 maintains a closed state when the drive signal is not supplied by the ECU 10, whereas when the drive signal is supplied, they achieves an effective opening area corresponding to the drive signal. The front pressurize linear valve 58 can linearly control an amount of fluid flowing from the high-pressure passage 50 to the front fluid pressure passage 62. The front depressurize linear valve 66 linearly controls an amount of fluid flowing from the front fluid pressure passage 62 to the reservoir tank 28. Similarly, the rear pressurize linear valve 60 linearly control an amount of fluid flowing from the high-pressure passage 50 to the rear fluid pressure passage 64. The rear depressurize linear valve 68 linearly control an amount of fluid flowing from the rear fluid pressure passage 64 to the reservoir tank 28.

The front fluid pressure passage 62 is connected to a front fluid pressure circuit 72 via a front cut valve 70 (hereinafter referred to as FCV 70). The FCV 70 is a two-position solenoid valve which normally maintains a closed state. The FCV 70 is changed to the open state when the drive signal is supplied by the ECU 10. When the FCV 70 is in the open state, a brake fluid pressure is provided to the front fluid pressure circuit 72 from the fluid pressure passage 62.

The above-mentioned fluid pressure passage 40 is also connected to the front fluid pressure circuit 72. When the master CV 36 is in the open state, the master cylinder 14 is connected to the fluid pressure passage 40. In this state, the brake fluid pressure equal to the master cylinder pressure $P_{M/C}$ is introduced into the front fluid pressure circuit 72.

When the master CV 36 is in the closed state, the master cylinder 14 is connected to the fluid pressure passage 40 only via the check valve 38. In this state, if the master cylinder pressure $P_{M/C}$ is higher than the pressure in the front fluid pressure circuit 72, the pressure in the front fluid pressure circuit 72 is increased up to the master cylinder $P_{M/C}$. On the other hand, if the master cylinder pressure $P_{M/C}$ is lower than the pressure in the front fluid pressure circuit 72, the pressure in the front fluid pressure circuit 72 is maintained to be a level different from the master cylinder pressure $P_{M/C}$.

The front fluid pressure circuit 72 includes a front wheel cylinder pressure sensor 74 (hereinafter referred to as a $P_F$ sensor 74). The $P_F$ sensor 74 is connected to the FCV 70 and a connection passage 76 which is connected to the fluid pressure passage 40. The $P_F$ sensor 74 outputs an electric signal corresponding to a pressure in the connection passage 76. The output signal of the $P_F$ sensor 74 is supplied to the ECU 10. The ECU 10 detects the pressure in the connection passage based on the output signal of the connection passage 76.

The connection passage 76 is connected to a wheel cylinder 82 of the left front wheel FL via a front hold valve 78 and a check valve 80. The check valve 86 is a one-way valve which permits a flow in a direction from the wheel cylinder 82 to the connection passage 76. The front hold valve 78 is a two-position solenoid valve which normally maintains an open state. The front hold valve 78 is changed to a closed state when a drive signal is supplied form the ECU 10.

The connection passage 76 is connected to a wheel cylinder 88 of the right front wheel RL via a front hold valve 84 and a check valve 86. The check valve 86 is a one-way valve which permits a flow in a direction from the wheel cylinder 88 to the connection passage 76. The front hold valve 84 is a two-position solenoid valve which normally maintains an open state. The front hold valve 84 is changed to a closed state when a drive signal is supplied form the ECU 10.

The wheel cylinders 82 and 88 are connected to a depressurize passage 94 via front depressurize valves 90 and 92, respectively. The front depressurize valves 90 and 92 are two-position solenoid valves which normally maintains a closed state. The front depressurize valves 90 and 92 are changed to an open state when drive signals are supplied from the ECU 10, respectively.

The depressurize passage 94 is connected to the reservoir tank 28 via a reservoir cut valve 96 (hereinafter referred to as a reservoir CV 96). The reservoir CV 96 is a two-position solenoid valve which normally maintains a closed state. The reservoir CV 96 is turned to an open state when a drive signal is supplied from the ECU 10.

A rear wheel cylinder pressure sensor 98 (hereinafter referred to as a $P_R$ sensor 98) is connected to the rear fluid passage 64. The $P_R$ sensor 98 outputs an electric signal corresponding to a pressure in the rear fluid pressure passage 64. The output signal of the $P_R$ sensor 98 is supplied to the ECU 10. The ECU 10 detects the pressure in the rear fluid pressure passage 64 based on the output signal of the $P_R$ sensor.

The rear fluid pressure passage 64 is connected to the connection passage 104 of a rear fluid pressure circuit 102 via a rear cut valve (hereinafter referred to as RCV 100). The RCV 100 is a two-position solenoid valve which normally maintain an open state. The RCV 100 is changed to a closed state when a drive signal is supplied from the ECU 10. When the RCV 100 is in the open state, a pressure in the fluid pressure passage 64 is provided to the rear fluid pressure circuit 102.

The connection passage 104 is connected to a wheel cylinder 110 of the left rear wheel RL via a rear hold valve 106 and a check valve 108. The check valve 108 is a one-way valve which permits a flow of fluid only in a direction from the wheel cylinder 110 to the connection passage 104. The rear holding valve 106 is a two-position solenoid valve which normally maintains an open state. The rear hold valve 106 is changed to a closed state when a drive signal is supplied form the ECU 10.

The connection passage 104 is connected to a wheel cylinder 116 of the right rear wheel RR via a rear hold valve 112 and a check valve 114. The check valve 114 is a one-way valve which permits a flow of fluid only in a direction from the wheel cylinder 116 to the connection passage 104. The rear holding valve 112 is a two-position solenoid valve which normally maintains an open state. The rear hold valve 112 is changed to a closed state when a drive signal is supplied form the ECU 10.

The wheel cylinders 110 and 116 are connected to the depressurize passage 94 via rear depressurize valves 118 and 120, respectively. The rear depressurize passages 118 and 120 are two-position solenoid valves which normally maintain a closed state. The rear depressurize passages 118 and 120 are changed to an open state when drive signals are supplied form the ECU 10.

Wheel speed sensors 122 to 128 which detect respective wheels are provided near the left and right front wheels FL and FR and the left and right rear wheels RL and RR. Each of the wheel speed sensors 122 to 128 generates a pulse signal at a period corresponding to the respective wheel. The ECU 10 calculates the rotational speed $V_W$ of each of the wheels based on the period of the pulse signal output from the wheel speed sensors 122 to 128. Additionally, the ECU 10 calculates vehicle speed V and vehicle deceleration $G_R$ based on the rotational speed $V_W$.

A description will now be given of a basic operation of the brake fluid pressure control apparatus according to the present embodiment. When a brake depression force $F_P$ is applied to the brake pedal 12, the pressure in the first fluid pressure chamber 22 and the second fluid pressure chamber 24 of the master cylinder 14 is increased. When the pressure in the second fluid pressure chamber 24 reaches the operation pressure of the pressure switch 32, the pressure switch 32 is turned on, and the ECU 10 recognizes the initiation of a brake operation.

When the initiation of the brake operation is recognized, the ECU 10 controls the FCV 70 and the RCV 100 to be in the open state. Thereafter, the flow of the brake fluid from the master cylinder 14 is prohibited, and the brake fluid pressure adjusted by the front pressurize linear valve 58 and the front depressurize linear valve 66 is provided to the connection passage 76 of the front fluid pressure circuit 72 and the brake fluid pressure adjusted by the rear pressurize linear valve 60 and the rear depressurize linear valve 68 is provided to the connection passage 104 of the rear fluid pressure circuit 102. Hereinafter, the front pressurize linear valve 58 and the front depressurize linear valve 66 together may be referred to as Fr linear valves 58 and 66, and the rear pressurize linear valve 60 and the rear depressurize linear valve 68 together may be referred to as Rr linear valves 60 and 68.

In the above-mentioned state, the $P_{M/C}$ sensor 30 detects the master C cylinder pressure $P_{M/C}$ which corresponds to the brake depression force $F_P$. Additionally, the $P_F$ sensor 74 and the $P_R$ sensor 98 detects the brake fluid pressure $P_F$ adjusted by the Fr linear valves 58 and 66 and the brake fluid pressure $P_R$ adjusted by the Rr linear valve 60 and 68, respectively. The ECU 10 controls the Fr linear valves 58 and 66 so that the brake fluid pressure $P_F$ detected by the Fr linear valves 58 and 66 has a predetermined power ratio to the master cylinder pressure $P_{M/C}$. The ECU 10 controls the Rr linear valves 60 and 68 so that the brake fluid pressure $P_R$ detected by the Rr linear valves 60 and 68 has a predetermined power ratio to the master cylinder pressure $P_{M/C}$.

When the brake fluid pressure adjusted by the Fr linear valves 58 and 66 and the Rr linear valves 60 and 68 is provided to the wheel cylinders 82, 88, 110 and 116 without being controlled (hereinafter this state is referred to as a normal condition), the front hold valves 78 and 84 are maintained to be in the open state and the front depressurize valves 90 and 92 are maintained to be in the closed state. In such a condition, the brake fluid pressure $P_F$ introduced to the connection passage 76 of the front fluid pressure circuit 72 is provided to the wheel cylinders 82 and 88. In this state, the wheel cylinder pressure $P_{W/C}$ in the wheel cylinders 82 and 88 is controlled to have a predetermined power ratio to the brake depression force $F_P$.

Similarly, in the normal condition, the rear hold valves 106 and 112 are maintained to be in the open state and the rear depressurize valves 118 and 120 are maintained to be in the closed state. In such a condition, the brake fluid pressure $P_R$ introduced to the connection passage 104 of the front fluid pressure circuit 102 is provided to the wheel cylinders 110 and 116. In this state, the wheel cylinder pressure $P_{W/C}$ in the wheel cylinders 110 and 116 is controlled to have a predetermined power ratio to the brake depression force $F_P$.

As mentioned above, in the brake fluid pressure control apparatus according to the present embodiment, the wheel cylinder pressure $P_{W/C}$ provided to the wheel cylinders 82, 88, 110 and 116 can be adjusted to a fluid pressure in response to the brake depression force $F_P$. An operational mode which achieves the above-mentioned function is hereinafter referred to as a normal mode.

In the brake fluid pressure control apparatus according to the present embodiment, the Fr linear valves 58 and 66 and the Rr linear valves 60 and 68 can provide the brake fluid pressures $P_F$ and $P_R$ which are different from the master cylinder pressure $P_{M/C}$. Thus, according to the brake fluid pressure control apparatus of the present embodiment, the wheel cylinder pressure in the wheel cylinders 82, 88, 110 and 116 can be increased toward an arbitrary pressure. The operational mode which achieves the above-mentioned function is hereinafter referred to as a pressurizing mode.

In the brake fluid pressure control apparatus according to the present embodiment, when the front hold valve 78 is closed and the front depressurize valve 90 is also closed, the wheel cylinder pressure $P_{W/C}$ of the wheel cylinder 82 can be maintained. Similarly, the wheel cylinder pressure $P_{W/C}$ of the wheel cylinders 88, 110 and 116 can be maintained by closing the respective hold valves 84, 106 and 112 and the respective depressurize valves 92, 118 and 120. As mentioned above, in the brake fluid pressure control apparatus according to the present embodiment, the wheel cylinder pressure $P_{W/C}$ of the wheel cylinders 82, 88, 110 and 116 can be maintained at an arbitrary fluid pressure. The operational mode which achieves the above-mentioned function is hereinafter referred to as a maintaining mode.

In the brake fluid pressure control apparatus according to the present embodiment, when the front hold valve 78 is closed and the front depressurize valve 90 and the reservoir CV 90 are open, the wheel cylinder pressure $P_{W/C}$ of the wheel cylinder 82 can be decreased. Similarly, the wheel cylinder pressure $P_{W/C}$ of the wheel cylinders 88, 110 and 116 can be decreased by closing the respective hold valves 84, 106 and 112 and opening the respective depressurize valves 92, 118 and 120 while the reservoir CV 96 is open. As mentioned above, in the brake fluid pressure control apparatus according to the present embodiment, the wheel cylinder pressure $P_{W/C}$ of the wheel cylinders 82, 88, 110 and 116 can be decreased to an arbitrary pressure. The operational mode which achieves the above-mentioned function is hereinafter referred to as a depressurizing mode.

The ECU 10 appropriately achieves the above-mentioned normal mode, pressurizing mode, maintaining mode and depressurizing mode based on a slip rate of each of the wheels FL, FR, RL and RR or moving conditions of the vehicle. In the normal mode, the brake condition which responds to the drive's will can be achieved. When the pressurizing mode, maintaining mode and the depressurizing mode are appropriately achieved in combination, the brake fluid pressure control which appropriately maintains the stable moving condition of the vehicle can be achieved.

In the brake fluid pressure control apparatus according to the present embodiment, if a malfunction occurs in the Fr liner valves 58 and 66, the wheel cylinder pressure $P_{W/C}$ of the wheel cylinders 82 and 88 cannot be increased appropriately. On the other hand, in the case where a malfunction occurs in the Fr linear valves 58 and 66, the master cylinder 14 can be connected to the wheel cylinders 82 and 88 after the master CV 36 is open and the FCV 70 is closed.

When the wheel cylinders 82 and 88 are connected to the master cylinder 14, the wheel cylinder pressure $P_{W/C}$ of the left and right front wheels FL and FR can be adjusted to be equal to the master cylinder pressure $P_{M/C}$. Thus, in the present embodiment, if a malfunction occurs in the Fr linear valves 58 and 66, the wheel cylinder pressure $P_{W/C}$ of the wheel cylinders 82 and 88 is adjusted by using the master cylinder 14 as a fluid pressure source. Thus, according to the brake fluid pressure control apparatus of the present embodiment, an appropriate fail safe function can be achieved against malfunctioning of the Fr linear valves 58 and 66.

In the present embodiment, as mentioned above, the Fr linear valves 58 and 66 and the Rr linear valves 60 and 68 are controlled based on the detected pressure value of the $P_{M/C}$ sensor 30. Accordingly, if a malfunction occurs in the $P_{M/C}$ sensor 30, the Fr linear sensors 58 and 66 and the Rr linear valves 60 and 68 cannot be accurately controlled in the same manner with that of the normal condition.

However, if a malfunction occurs in the $P_{M/C}$ sensor 30, a brake force corresponding to the master cylinder pressure $P_{M/C}$ can be generated in the left and right front wheels FL and FR after the master cylinder 14 is connected to the wheel cylinders 82 and 88 similar to the case where a malfunction occurs in the Fr linear valves 58 and 66. Accordingly, a brake force corresponding to the brake depression force $F_P$ can be generated by stopping the operation of the Fr linear valves 58 and 66 and the Rr linear valves 60 and 68 and connecting the master cylinder 14 to the wheel cylinders 82 and 88.

However, according to the above-mentioned operation, the braking ability of the vehicle may be considerably decreased as compared to the normal condition. The brake fluid pressure control apparatus according to the present embodiment prevents a large decrease in the braking ability of the vehicle when a malfunction occurs in the $P_{M/C}$ sensor 30, that is, to generate a sufficiently large brake force when a Malfunction occurs in the $P_{M/C}$ valve 30.

Figure 2:
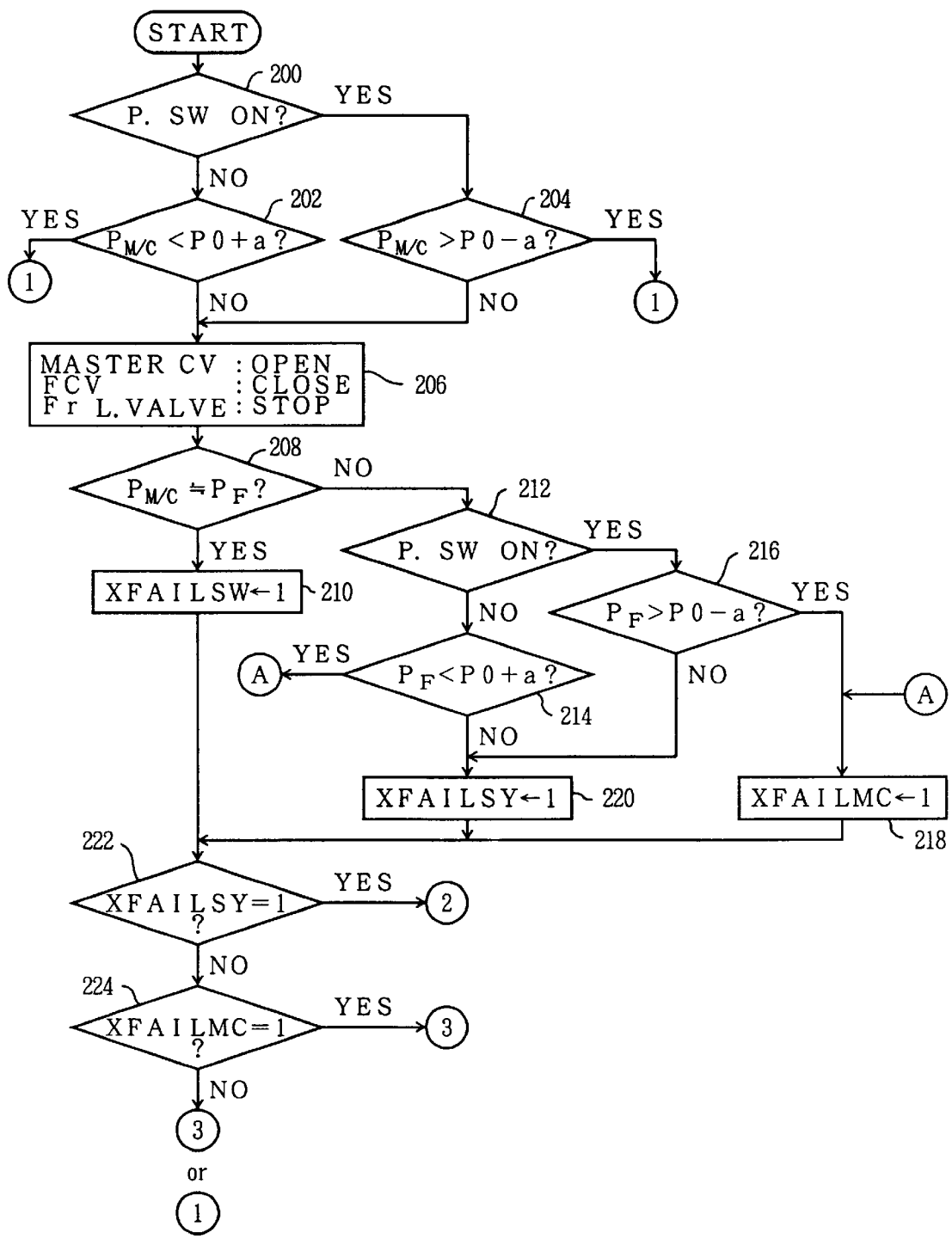
FIG. 2 is a part of a control routine performed in the brake fluid pressure control apparatus shown in FIG. 1.
Figure 3:
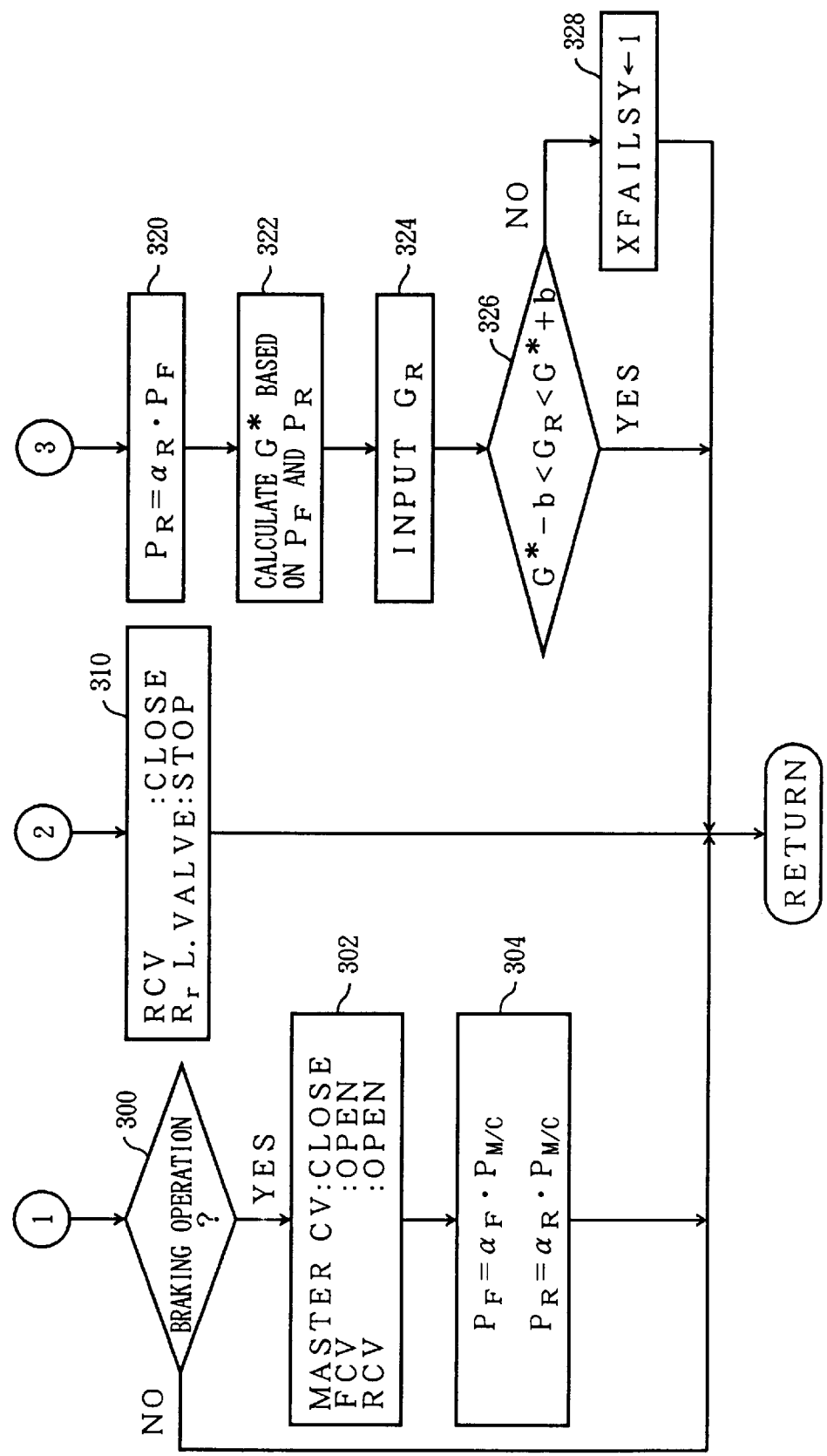
FIG. 3 is a part of the control routine performed in the brake fluid pressure control apparatus shown in FIG. 1.

The above-mentioned function can be achieved in the structure shown in FIG. 1 by the ECU 10 performing the routine shown in FIGS. 2 and 3. The routine shown in FIGS. 2 and 3 is a periodic interruption routine which is started every predetermined period. When the routine is started, a process of step 200 is performed first.

In step 200, it is determined whether or not the pressure switch 32 is outputting an on-signal. The pressure switch 32 outputs the on-signal when the master cylinder pressure $P_{M/C}$ is greater than a predetermined pressure value P0. If it is determined that the on-signal is not being output from the pressure switch 32, the process of step 202 is then performed. On the other hand, if it is determined that the on-signal is being output from the pressure switch 32, the process of step 204 is performed.

In step 202, it is determined whether or not a relationship $P_{M/C}<P0+a$ is established between the detected pressure value $P_{M/C}$ of the $P_{M/C}$ sensor 30 and the predetermined pressure value P0. If the relationship is established, the process of steps 300 to 304 shown in FIG. 3 is performed. On the other hand, if the above relationship is not established, the process of step 206 is performed.

Additionally, in step 204, it is determined whether or not a relationship $P_{M/C}>P0-a$ is established between the detected pressure value $P_{M/C}$ of the $P_{M/C}$ sensor 30 and the predetermined pressure value P0. If the relationship is established, the process of steps 300 to 304 shown in FIG. 3 is performed. On the other hand, if the above relationship is not established, the process of step 206 is performed.

As mentioned above, the pressure switch 32 outputs the on-signal when a master cylinder pressure greater than P0 is generated. Thus, when both the pressure switch 32 and the $P_{M/C}$ sensor 30 are normal, the relationships in steps 202 and 204 must be established. It should be noted that "a" in the above-mentioned relationships is a constant which absorbs the detection tolerances of the $P_{M/C}$ sensor 30 and the pressure switch 32. Thus, according to this routine, the process of steps 300 to 304 is performed when it is determined that the relationship between the output characteristic of the pressure switch 32 and the output characteristics of the $P_{M/C}$ sensor 30 satisfies a normal relationship. On the other hand, the process of step 206 and the subsequent steps is performed when it is recognized that the relationship between the output characteristic of the pressure switch 32 and the characteristic of the $P_{M/C}$ sensor is abnormal. This abnormality is hereinafter referred to as master system abnormality.

The process subsequent to step 206 is performed in order to specify the aspect of the abnormality occurring in the brake fluid pressure control apparatus and to achieve an appropriate fail safe operation in response to the contents of the abnormality. Specifically, in step 206, an operation is performed so as to open the master CV 36, close the FCV 70 and stop the operation of the Fr linear valves 58 and 66. When this operation is performed, the wheel cylinders 82 and 88 of the left and right wheels FL and FR are disconnected from the Fr linear valves 58 and 66, and the master cylinder 14, and is connected to the master cylinder 14. When this state is established, the same pressure is applied to the $P_F$ sensor 74 and the $P_{M/C}$ sensor 30. After the process of step 206 is completed, the process of step 208 is then performed.

In step 208, it is determined whether or not the detected pressure value $P_{M/C}$ of the $P_{M/C}$ sensor 30 and the detected pressure value of the $P_F$ sensor 74 are substantially equal to each other. If it is determined that the detected pressure value $P_{M/C}$ and the detected pressure value $P_F$ are substantially equal to each other, the process of step 210 is performed.

As mentioned above, at the stage where the process of step 208 is performed, the same pressure is provided to the $P_{M/C}$ sensor 30 and the $P_F$ sensor. Accordingly, when both the $P_{M/C}$ sensor 30 and the $P_F$ sensor 74 exhibit appropriate output characteristics, the detected pressure value $P_{M/C}$ and the detected pressure value $P_F$ must be substantially equal to each other. In other words, when the detected pressure value $P_{M/C}$ and the detected pressure value $P_F$ are substantially equal to each other, it can be determined that the output characteristic of the $P_{M/C}$ sensor 30 and the output characteristic of the $P_F$ sensor 74 correspond to each other. Additionally, when the output characteristics correspond to each other, it can be determined that both the $P_{M/C}$ sensor 30 and the $P_F$ sensor 74 are normally operated.

If the master system abnormality occurs and also the output characteristic of the $P_{M/C}$ sensor 30 corresponds to the output characteristic of the $P_F$ sensor, it can be determined that the cause of the master system abnormality is a malfunction of the pressure switch 32. Thus, in step 210, in order to indicate the malfunction occurring in the pressure switch, "1" is set to a flag XFAILSW. After this process is completed, the process of step 222 is performed.

If it is determined, in step 208, that the detected pressure value $P_{M/C}$ of the $P_{M/C}$ sensor 30 and the detected pressure value $P_F$ of the $P_F$ sensor are not substantially equal to each other, the process of step 212 is performed. It is determined that a malfunction is occurring in at least one of the $P_{M/C}$ sensor 30 and the $P_F$ sensor when the detected pressure value $P_{M/C}$ and the detected pressure value $P_F$ are not substantially equal to each other. The process subsequent to step 212 is performed to specify the position of the abnormality occurrence.

In step 212, it is determined whether or not the pressure switch 32 is outputting the on-signal. If it is determined that the on-signal is not output from the pressure switch 32, the process of step 214 is then performed. On the other hand, if it is determined that the on-signal is being output from the pressure switch 32, the process of step 216 is performed.

In step 214, it is determined whether or not a relationship $P_F<P0+a$ is established between the detected pressure value $P_F$ of the $P_F$ sensor and the predetermined pressure value P0. The relationship is established when the relationship between the output characteristic of the $P_F$ sensor 74 and the output characteristics of the pressure switch 32 satisfies an appropriate relationship. When it is determined, in step 214, that the relationship $P_F<P0+a$ is established, the process of step 218 is then performed. On the other hand, if it is determined, in step 214, that the relationship $P_F<P0+a$ is not established, the process of step 220 is performed.

If it is determined, in step 214 or 216, that the output characteristic of the $P_F$ sensor 74 and the output characteristic of the pressure switch 32 satisfy an appropriate relationship, it can be determined that both the $P_F$ sensor 74 and the pressure switch 32 function normally. If the master system abnormality is occurring and the pressure switch 32 is normally functioning, it can be determined that the cause of the master system abnormality is a malfunction of the $P_{M/C}$ sensor 30. Accordingly, in step 218, in order to indicate the malfunctioning of the $P_{M/C}$ sensor 30, "1" is set to a flag XFAILMC. After the above-mentioned operation is completed, the process of step 222 is then performed.

On the other hand, if it is determined, in step 214 or 216, that the output characteristic of the $P_L$ sensor 74 and the output characteristic of the pressure switch 32 do not satisfy an appropriate relationship, it can be determined that the output characteristic of the $P_{M/C}$ sensor 30, the output characteristic of the $P_F$ sensor 74 and the output characteristic of the pressure switch 32 does not satisfy an appropriate relationship with respect to each other. In such a condition, it is difficult to specify the position where the abnormality is occurring in the brake fluid pressure control apparatus. In this case, in order to indicate that the position of abnormality cannot be specified, "1" is set to a flag XFAILSY in step 220. After the above-mentioned operation is completed, the process of step 222 is performed.

According to the process of steps 200 to 220, the master system abnormality can be recognized when abnormality is recognized in the relationship between the output characteristic of the $P_{M/C}$ sensor 30 and the output characteristic of the $P_F$ sensor 74 during the process of braking operations repeatedly performed by a driver. Thereafter, when an equal fluid pressure is detected by the $P_{M/C}$ sensor 30 and the $P_F$ sensor 74, "1" is set to only the flag XFAILSW. If the cause of the master system abnormality is truly the malfunction of the pressure switch 32, the state where "1" is set to only to the flag XFAILSW is maintained thereafter. If the true cause of the master system abnormality is not only the malfunction of the pressure switch 32, that is, when a malfunction is occurring in the $P_{M/C}$ sensor 30, a condition occurs where the detected pressure value $P_{M/C}$ does not correspond to the detected pressure value $P_F$ while the present routine is repeated. After occurrence of such a condition, if the output characteristic of the output of the pressure switch 32 and the detected pressure value $P_F$ of the $P_F$ sensor 74 satisfy an appropriate relationship, "1" is set to the flag XFAILMC. If both the pressure switch 32 and the $P_F$ sensor 74 are truly normal, the state where "1" is set to both the flag XFAILSW and the flag XFAILMC is maintained thereafter.

When a malfunction is occurring in the $P_{M/C}$ sensor 30 and also a malfunction is occurring in at least one of the pressure switch 32 and the $P_F$ sensor 74, a condition occurs where the output characteristic of the pressure switch 32 and the output characteristic of the $P_F$ sensor 74 do not satisfy an appropriate relationship. If this condition occurs while the routine is repeatedly performed, the process of step 220 is executed so that "1" is set also to the flag XFAILSY.

As mentioned above, according to the process of steps 200 to 220, one of states is established in response to the condition of abnormality occurring in the brake fluid pressure control apparatus, where "1" is set to only the flag XFAILSW, where "1" is set to the flags XFAILSW and XFAILMC, and where "1" is set to all three of the flags. After the process of the above-mentioned steps 200 to 220 is completed, the process of step 222 is then performed.

In step 222, it is determined whether or not "1" is set to the flag XFAILSY. As mentioned above, "1" is set to the flag XFAILSY when the output characteristic of the $P_{M/C}$ sensor 30, the output characteristic of the pressure switch 32 and the output characteristic of the $P_F$ sensor 74 do not satisfy an appropriate relationship. Thus, if it is determined that XFAILSY=1, the process of step 310 is then performed. On the other hand, if it is determined that XFAILSY is not established, the process of step 224 is performed.

In step 224, it is determined whether or not "1" is set to the flag XFAILMC. As mentioned above, "1" is set to the flag XFAILMC when the pressure switch 32 and the $P_F$ sensor 74 are normal and it is assumed that a malfunction is occurring in the $P_{M/C}$ sensor 30. If it is determined that XFAILMC=1 is established, the process of steps 320 to 328 shown in FIG. 3 is then performed.

If it is determined, in step 224, that XFAILMC=1 is not established, it is determined that "1" is set to only the flag XFAILSW among the three flags. As mentioned above, this condition occurs when the $P_{M/C}$ sensor 30 and the $P_F$ sensor 74 are normal and a malfunction is occurring in the pressure switch 32. In the present embodiment, in such a case, the process of step 320 to 328 is performed. It should be noted that the necessity of the determination of step 224 will be described later.

As mentioned above, the ECU 10 executes step 300 to 304 shown in FIG. 3 when the master system abnormality is not occurring. The process of step 300 to 304 is provided for achieving the normal mode. Specifically, in step 300, it is determined whether or not a braking operation is performed. In the present embodiment, when the on-signal is output from the pressure switch 32 or when the master cylinder pressure $P_{M/C}$ which is greater than the predetermined pressure value P0 is detected, it is determined that a braking operation is performed. If it is determined that the braking operation is performed, the process of step 302 is performed. On the other hand, if it is determined that the braking operation is not performed, the routine is ended without further processes.

In step 302, a process is performed to close the master CV 36 and open the FCV 70 and the RCV 100. When this process is performed, the wheel cylinders 82 and 88 of the left and right front wheels FL and FR are connected to the Fr linear valves 58 and 66, respectively, and the wheel cylinders 110 and 116 of the left and right rear wheels RL and RR are connected to the Rr linear valves 60 and 68, respectively. After the above-mentioned process has been completed, the process of step 304 is performed.

In step 304, a control process for the Fr linear valves 58 and 66 is performed so that the detected pressure value $P_F$ of the $P_F$ sensor 74 becomes equal to the product "$P_{M/C}*\alpha_F$" of the detected pressure value $P_{M/C}$ of the $P_{M/C}$ sensor 30 and the predetermined power ratio $\alpha_F$. Additionally, a control process for the Rr linear valves 60 and 68 is performed so that the detected pressure value $P_R$ of the $P_R$ sensor 98 becomes equal to the product "$P_{M/C}*\alpha_R$" of the detected pressure value $P_{M/C}$ of the $P_{M/C}$ sensor 30 and the predetermined power ratio $\alpha_R$. After the process of step 304 is completed, the routine is ended.

According to the above mentioned process, the brake fluid can be provided to the wheel cylinders 82 and 88 of the left and right front wheels FL and FR and the wheel cylinders 110 and 116 of the left and right rear wheels RL and RR by using the Fr linear valves 58 and 66 and the Rr linear valves 60 and 68 as a fluid pressure source, respectively. Additionally, the wheel cylinder pressure $P_{W/C}$ can be accurately controlled based on the detected pressure value $P_{M/C}$ of the $P_{M/C}$ sensor 30.

As mentioned above, the ECU 10 executes the process of step 310 when an abnormality is detected and the position of the abnormality cannot be specified. It should be noted that the process of step 310 is executed on the assumption that the process of step 206 has been executed, that is, the master CV 36 is open and the FCV 70 is closed and further the operation of the Fr linear valves 58 and 66 is stopped.

In step 310, the RCV 100 is closed and the operation of the Rr linear valves 60 and 68 is stopped. After the above-mentioned process is performed, the master cylinder 14 is connected to the wheel cylinders 82 and 88, and the Fr linear valves 58 and 66 and the Rr linear valves 60 and 68 are disconnected from the wheel cylinders 82, 88, 110 and 116.

When the above-mentioned condition is established, the brake fluid pressure is not provided to the wheel cylinders 110 and 116 of the left and right rear wheels RL and RR. Additionally, the wheel cylinder pressure $P_{W/C}$ is adjusted to be equal to the master cylinder pressure $P_{M/C}$. In this case, the wheel cylinder corresponding to the brake pedal depression force $F_P$ is positively generated in the left and right front wheels irrespective of the output conditions of the $P_{M/C}$ sensor 30, the $P_F$ sensor 74 and the pressure switch 32. Thus, according to the brake fluid pressure control apparatus according to the present embodiment, an appropriate fail safe function can be achieved with respect to the abnormality occurs and the position of the abnormality cannot be determined. It should be noted that the master cylinder pressure $P_{M/C}$ can also be provided to the wheel cylinders 116 and 110 of the rear wheels RR and RL by opening the valves 120 and 118.

As mentioned above, the ECU 10 executes the process of steps 320 to 328 when $P_F$ sensor 74 is normal and a malfunction is occurring in the $P_{M/C}$ sensor 30 and also when the $P_F$ sensor is normal and a malfunction is occurring in the pressure switch 32. It should be noted that the process of steps 320 to 328 is executed on the assumption that the process of step 206 has been performed, similar to the process of step 310, that is, the detected pressure value $P_F$ is equal to the master cylinder pressure $P_{M/C}$. In step 320, a process for controlling the Rr linear valves 60 and 68 is performed so that the detected pressure value $P_R$ of the $P_R$ sensor 98 becomes equal to the product "$P_F * \alpha_R$" of the detected pressure value $P_F$ and the predetermined power ratio $\alpha_R$. According to the above-mentioned process, the wheel cylinder pressure $P_{W/C}$ of the left and right front wheels FL and FR can be adjusted to be equal to the master cylinder pressure $P_{M/C}$. Additionally, the brake fluid pressure can be provided to the wheel cylinders 110 and 116 of the left and right rear wheels RL and RR, and the wheel cylinder pressure $P_{W/C}$ can be accurately controlled based on the detected pressure value $P_F$ of the $P_F$ sensor 74. After the above-mentioned process is completed, the process of step 322 is then performed.

In step 322, an assumed vehicle deceleration G* is calculated based on the wheel cylinder pressure $P_{W/C}$ of the wheel cylinders 82 and 88 which corresponds to the detected pressure value $P_R$ of the $P_R$ sensor 98, that is, the wheel cylinder pressure $P_{W/C}$ of the wheel cylinders 110 and 116. The ECU 10 stores a map of the assumed vehicle deceleration G* prepared by using the wheel cylinder pressure $P_{W/C}$ of the wheel cylinders 82 and 88 and the wheel cylinder pressure $P_{W/C}$ of the wheel cylinders 110 and 116 as parameters. In step 322, the assumed vehicle deceleration G* is calculated by referring to the map. After the above-mentioned process is completed, the process of step 324 is preformed.

In step 324, the vehicle deceleration $G_R$ which is calculated in a different routine is read. The vehicle deceleration $G_R$ is a differentiated value of the vehicle speed V which is calculated based on the output pulses of the wheel speed sensors 122 to 128. In the present embodiment, the vehicle deceleration $G_R$ is regarded as an actual deceleration which is actually generated in the vehicle. After the above-mentioned process is completed, the process of step 326 is performed.

In step 326, it is determined whether or not the vehicle deceleration $G_R$ and the assumed vehicle deceleration G* satisfy a relationship $G*-b<G_R<G*+b$. If this relationship is satisfied, it is determined that the brake fluid pressure control apparatus is providing an appropriate braking ability as initially planned. In this case, the routine is ended without any other process being performed.

On the other hand, if the above-mentioned relationship is not satisfied, it is determined that the brake fluid pressure control apparatus is not providing the appropriate braking ability as initially planned, that is, it can be determined that a malfunction is occurring in the brake fluid pressure control apparatus. In this case, "1" is set to the flag XFAILSY, and the routine is ended.

According to the above-mentioned process, the wheel cylinder pressure $P_{W/C}$ can be controlled based on the detected pressure value $P_F$ of the $P_F$ sensor even when a malfunction is occurring in the $P_{M/C}$ sensor 30 or the pressure switch 32 and the $P_F$ sensor 74 is normal. Thus, in the brake fluid pressure control apparatus according to the present embodiment, if a malfunction is occurring in the $P_{M/C}$ sensor 30 or the pressure switch 32, a brake force corresponding to the master cylinder pressure $P_{M/C}$ can be generated in the left and right front wheels FL and FR, and a brake force having a predetermined power ratio to the master cylinder pressure $P_{M/C}$ can be generated in the left and right rear wheels RL and RR.

Additionally, in the above-mentioned process, "1" is set to the flag XFAILSY if a normal braking ability is not provided when the wheel cylinder pressure $P_{W/C}$ of the left and right rear wheels RL and RR is controlled based on the detected pressure value $P_F$ of the $P_F$ sensor 74. After "1" is set to the flag XFAILSY, the process of step 310 is performed instead of the process of steps 320 to 328. Accordingly, in the brake fluid pressure control apparatus according to the present embodiment, if an occurrence of an abnormality in the system escapes detection, an improper repetition of execution of the process of step 320 can be prevented.

As mentioned above, when the process of step 224 is performed, the ECU 10 executes the process of step 320 and the subsequent steps irrespective of the result of determination of the step 224. Accordingly, the process of step 224 does not always need to be executed when the above-mentioned process is performed.

If it is determined, in step 224, that the condition XFAILMC=1 is not satisfied, it can be determined that the $P_{M/C}$ functions normally. When the $P_{M/C}$ sensor 30 functions normally, the normal mode can be achieved even when a malfunction is occurring in the pressure switch 32. Thus, if it is determined, in step 224, that XFAILMC=1 is not satisfied, the process of step 300 to 304 may be executed instead of the process of step 320 to 328. When this process is performed, the process of step 224 is necessarily executed.

It should be noted that, in the above-mentioned embodiment, the $P_{M/C}$ sensor 30 corresponds to the "operational force sensor"; the Fr linear valves 58 and 66 and the Rr linear valves 60 and 68 correspond to the "linear fluid pressure source"; The wheel cylinders 82 and 88 of the left and right wheels FL and FR and the wheel cylinders 110 and 116 of the left and right wheels RL and RR correspond to the "first wheel cylinder" and the "second wheel cylinder", respectively; and the $P_F$ sensor 74 corresponds to the "first wheel cylinder pressure sensor". Additionally, the "fluid pressure source switching means" is achieved by the ECU 10 executing the process of step 206, and the "abnormal time control means" is achieved by the ECU 10 executing the process of step 320.

Additionally, the $P_R$ sensor 98 corresponds to the "second wheel cylinder pressure sensor". Additionally, the "assumed vehicle deceleration calculating means" is achieved by the ECU 10 executing the process of step 322; the "actual vehicle deceleration determining means" is achieved by the ECU 10 executing the process of step 324; and the "abnormal control prohibiting means" is achieved by the ECU 10 executing the process of steps 326 and 328.

The present invention is not limited to the specifically disclosed embodiments, and variations and modifications may be made without departing from the scope of the present invention.

What is claimed is:

1. A brake fluid pressure control apparatus for a brake system of a vehicle, comprising:

a sensor detecting a parameter corresponding to a magnitude of an operational force applied to the brake system to generate a brake force;

a master cylinder generating a master cylinder pressure corresponding to the operational force;

a fluid pressure source generating a fluid pressure adjusted based on the magnitude of the operational force;

a first wheel cylinder coupled to the master cylinder and to the fluid pressure source;

a second wheel cylinder provided with the fluid pressure;

a first wheel cylinder pressure sensor outputting a first wheel cylinder pressure value corresponding to a magnitude of a first wheel cylinder pressure;

malfunction detecting means for detecting a malfunction of the sensor;

connecting means for connecting, when no malfunction of the sensor is detected, the first wheel cylinder to the fluid pressure source, the connecting means connecting, when a malfunction of the sensor is detected, the first wheel cylinder to the master cylinder; and abnormal time control means for controlling the fluid pressure source, when the operational force sensor malfunction is detected, based on the first wheel cylinder pressure value.

2. The brake fluid pressure control apparatus as claimed in claim 1, wherein said operational force sensor comprises a master cylinder pressure sensor detecting the master cylinder pressure generated in said master cylinder and outputs a master cylinder pressure value corresponding to a magnitude of the master cylinder pressure.

3. The brake fluid pressure control apparatus as claimed in claim 2, further comprising a pressure switch which operates when the master cylinder pressure generated in said master cylinder exceeds a predetermined pressure.

4. The brake fluid pressure control apparatus as claimed in claim 3, wherein the malfunction detecting means detects a malfunction of the master cylinder pressure sensor based on an output of the pressure switch, the master cylinder pressure value and the first wheel cylinder pressure value.

5. The brake fluid pressure control apparatus as claimed in claim 4, wherein the malfunction detecting means detects malfunctions in the pressure switch based on an output of the pressure switch, the master cylinder pressure value and the first wheel cylinder pressure value.

6. The brake fluid pressure control apparatus as claimed in claim 4, wherein the malfunction detecting means detects malfunctions in the brake fluid pressure control apparatus other than the malfunctions in the master cylinder pressure sensor and the pressure switch based on an output of the pressure switch, the master cylinder pressure value and the first wheel cylinder pressure value.

7. The brake fluid pressure control apparatus as claimed in claim 6, wherein both of the first and second wheel cylinders are disconnected from the fluid pressure source and connected to the master cylinder so that the master cylinder pressure is provided to the first and second wheel cylinders when the malfunction detecting means detects a malfunction other than the malfunction in the master cylinder pressure sensor and the pressure switch.

8. The brake fluid pressure control apparatus as claimed in claim 2, further comprising a second wheel cylinder pressure sensor outputting a second wheel cylinder pressure value corresponding to a magnitude of the second wheel cylinder pressure, wherein the fluid pressure source includes first and second fluid pressure sources, the first and second wheel cylinder pressures being adjusted in proportion to the master cylinder pressure when malfunction detecting means does not detect a malfunction in the master cylinder pressure sensor.

9. The brake fluid pressure control apparatus as claimed in claim 1, further comprising:

a second wheel cylinder pressure sensor outputting a second wheel cylinder pressure value corresponding to a magnitude of the second wheel cylinder pressure;

assumed vehicle deceleration calculating means for calculating an assumed deceleration of the vehicle based on the first and second wheel cylinder pressure values;

actual vehicle deceleration determining means for determining an actual deceleration of the vehicle; and abnormal control prohibiting means for prohibiting operation of the abnormal time control means when a difference between the assumed deceleration and the actual deceleration exceeds a predetermined value.

10. The brake fluid pressure control apparatus as claimed in claim 9, wherein said assumed vehicle deceleration means calculates the assumed deceleration by reference to a map representing a relationship between the assumed deceleration and the first and second wheel cylinder pressure values.

* * * * *